United States Patent
Barrett

[11] 3,796,400
[45] Mar. 12, 1974

[54] AIRPLANE KITE

[76] Inventor: Bernard R. Barrett, 308 W. Graham, Lombard, Ill. 60148

[22] Filed: Dec. 1, 1972

[21] Appl. No.: 311,255

[52] U.S. Cl. .................................. 244/154, 46/79
[51] Int. Cl. ............................................ B64c 31/06
[58] Field of Search ............ 244/154, 153 R, 155 R, 244/DIG. 1; 46/79, 76

[56] References Cited
UNITED STATES PATENTS
| 865,419 | 9/1907 | Moorhead | 46/79 |
| 2,631,798 | 3/1953 | Guercio | 244/153 R |
| 3,229,938 | 1/1966 | Mularkey | 244/153 R |

Primary Examiner—George E. A. Halvosa
Assistant Examiner—Paul E. Sauberer
Attorney, Agent, or Firm—Oltsch & Knoblock

[57] ABSTRACT

A kite having a fuselage carrying left and right wings. The wings have a maximum span intermediate the ends of the fuselage and converge in fore and aft directions from such place of maximum span. That section of each wing which extends from the place of maximum span to the front end of the fuselage is concave, with the outer edge of such wing section being rolled.

10 Claims, 7 Drawing Figures

PATENTED MAR 12 1974 3,796,400
SHEET 2 OF 2
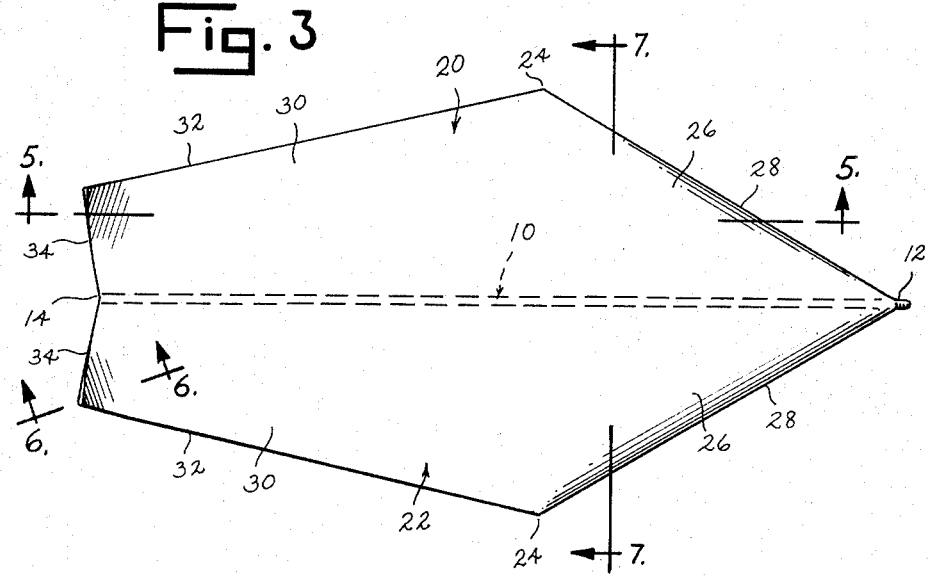
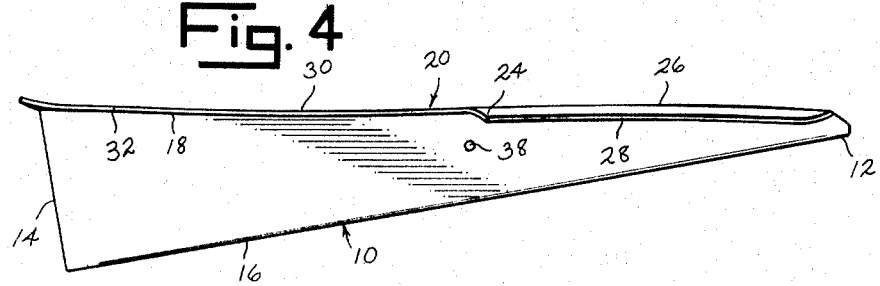
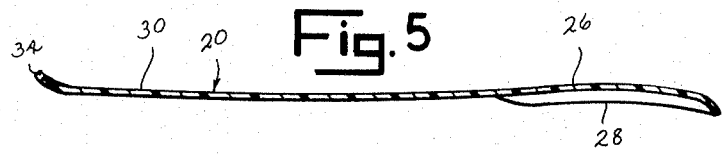
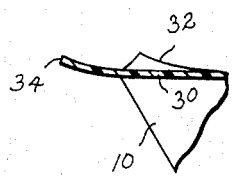
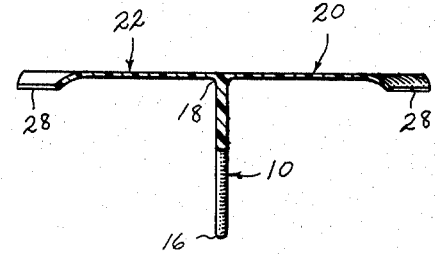

AIRPLANE KITE

SUMMARY OF THE INVENTION

This application relates to a kite and has particular application to a kite having an airplane design.

The kite of this invention includes a fuselage having front and rear ends. Left and right wings are carried by the fuselage, extending substantially the length thereof. The wings have a maximum span intermediate the ends of the fuselage and include fore end sections having outer edges which converge from the place of maximum wing span to the fuselage front end and aft sections having outer edges which converge from the place of maximum wing span toward the fuselage rear end. The fore wing sections are concave and have rolled or turned outer edges. A string is attached to the fuselage of the kite and is used to guide the kite when airborne. The kite can be constructed in an economical manner and can be made in various sizes.

Accordingly, it is an object of this invention to provide a kite of economical construction having the general shape of an airplane.

It is another object of this invention to provide a kite which can be used for stunts and which can be made in various sizes to accommodate the age, size, and desire of the kite user.

Still another object of this invention is to provide a kite having convergent fore and aft wing sections carried upon a fuselage to which the string of the kite is attached.

Other objects of this invention will become apparent upon a reading of the invention's description.

BRIEF DESCRIPTION OF THE DRAWINGS

A preferred embodiment of this invention has been chosen for purposes of illustration and description wherein:

FIG. 3 is a top plan view of the kite.

FIG. 4 is a side view of the kite.

FIG. 5 is a sectional view taken along line 5—5 of FIG. 3.

FIG. 6 is a fragmentary sectional view taken along line 6—6 of FIG. 3.

FIG. 7 is a cross sectional view taken along line 7—7 of FIG. 3.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

Figure 1:
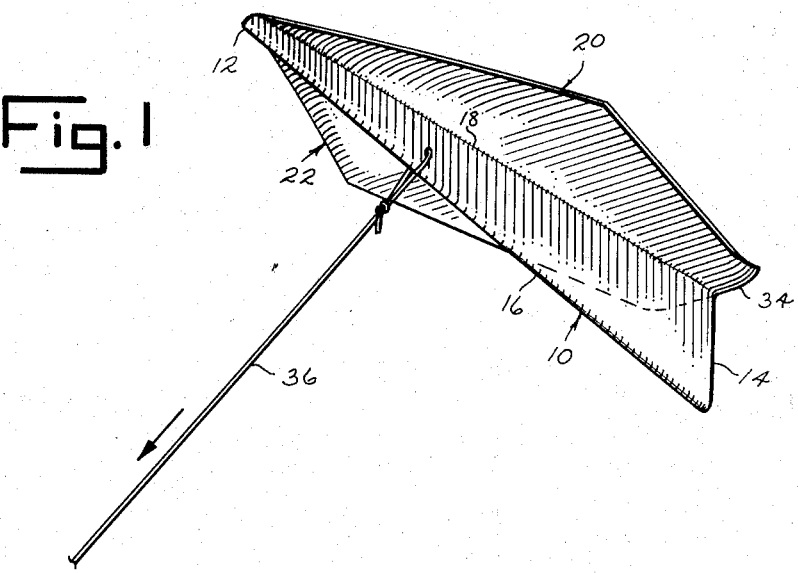
FIG. 1 is a perspective view of the kite shown in flight.
Figure 2:
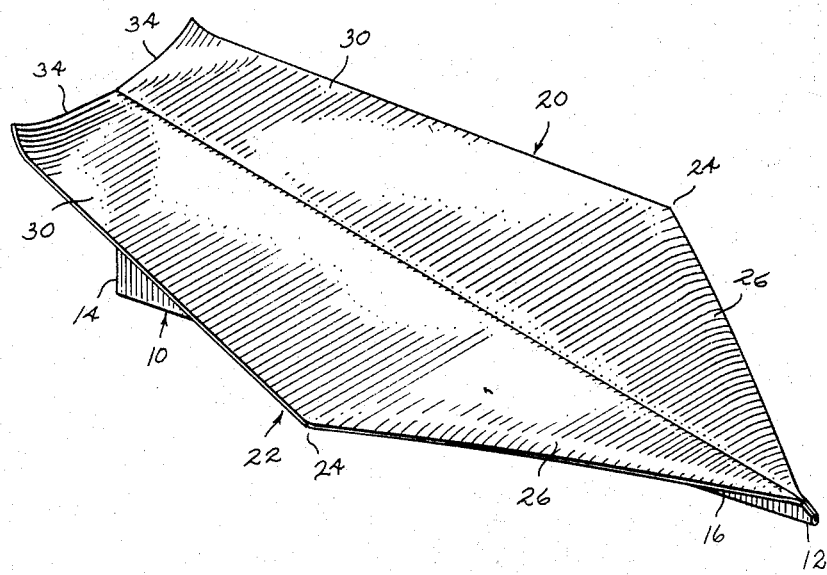
FIG. 2 is a top perspective view of the kite.

The kite illustrated in FIGS. 1–7 includes a fuselage 10 having a front end 12, a rear end 14, a lower edge 16 and an upper edge 18. A left wing 20 and a right wing 22 are carried at the upper edge 18 of fuselage 10. Wings 20 and 22 are substantially coplanar and extend substantially the full length of the fuselage.

Wings 20 and 22 are symmetrical, that is of like configurations, and include a place of maximum wing span which is designated by the reference numerals 24 and which is located between ends 12 and 14 of the fuselage. Each wing includes a fore section 26 which is defined in part by an outer edge 28 which converges from place 24 of maximum wing span to adjacent front end 12 of the fuselage. Additionally, each wing 20 and 22 includes an aft wing section 30 which is defined by an outer edge 32 which converges from place 24 of maximum wing span toward rear end 14 of the fuselage. The included angle between outer edges 28 of fore wing sections 26 is preferably between 45° and 60°. Each outer edge 32 of the aft wing sections is preferably angled relative to the center line of fuselage 10 at an angle between 12° and 25°.

Each fore wing section 26 is concave, as best shown in FIG. 5, with outer edges 28 thereof being downturned. Each aft wing section 30 of wings 20 and 22 may be of a substantially flat configuration or of a slightly convex configuration relative to the concavity of the fore wing sections. End edge 34 of each aft wing section 30 is preferably turned upwardly, as best shown in FIGS. 5 and 6. Fuselage upper edge 18 in which the general plane of left and right wings 20 and 22 lie and fuselage lower edge 16 converge toward fuselage front end 12. The included angle between fuselage lower edge 16 and the general plane of wings 20 and 22 is preferably between 20 and 30 degrees.

A string 36 is connected to the kite so as to provide a means for guiding the kite when airborne. The preferred location for connecting string 36 to the kite is through opening 38 in fuselage 10, although in some constructions of this invention, depending upon the size of the kite, it may be desirable to connect one or more guide strings to wings 20 and 22.

The length of the kite can be from 10 inches to 12 to 15 feet and may be constructed from foil, paper, foam material or balsa wood. While it is preferred that the kite be flown in the orientation shown in FIG. 1, it is to be understood that it is possible to fly the kite above described in an inverted form.

It is to be understood that the invention is not to be limited to the details given but may be modified within the scope of the appended claims.

What I claim is:

1. A kite comprising a fuselage having front and rear ends, left and right wings extending substantially the length of said fuselage, said wings being substantially coplanar and symmetrically formed, said wings each having a maximum span intermediate the ends of said fuselage and including a fore section having an outer edge which converges from said place of maximum span toward said fuselage front end and an aft section having an outer edge which converges from said place of maximum span toward said fuselage rear end, said fore wing sections being concave and having turned down outer edges, and means for accommodating the securement of a string to said kite, the plane of said fore wing sections across said place of maximum span being straight, the outer edges of said fore wing sections terminating rearwardly of said fuselage front end.

2. The kite of claim 1 wherein each aft wing section includes a laterally extending end edge located adjacent the rear end of said fuselage, each end edge being turned in an opposite direction from said turned outer edges.

3. The kite of claim 2 wherein each aft wing section is convex relative to the concavity of each fore wing section.

4. The kite of claim 1 wherein there is an included angle of 45° to 60° between the outer edges of said fore wing sections.

5. The kite of claim 4 wherein each outer edge of said aft wing section extends at an angle of between 12° and 25° relative to said fuselage.

6. The kite of claim 1 wherein said fuselage includes upper and lower edges, said wings carried at the upper edge of said fuselage.

7. The kite of claim 6 wherein said lower fuselage edge and the plane of said wings converge toward said fuselage front end.

8. The kite of claim 7 wherein the included angle between said lower fuselage edge and plane of said wings is between 20° and 30°.

9. The kite of claim 1 wherein said fuselage includes said string accommodating means.

10. The kite of claim 1 wherein said fuselage tapers downwardly from said fore wing section outer edges at its said front end.

* * * * *